United States Patent [19]

Aonuma et al.

[11] Patent Number: 4,647,625

[45] Date of Patent: Mar. 3, 1987

[54] PROCESS FOR MODIFYING CONJUGATED DIENE POLYMERS

[75] Inventors: Mitsuyoshi Aonuma, Tokyo; Hiroyuki Watanabe; Haruki Kawada, both of Yokohama; Kohkichi Noguchi, Kamakura; Akio Ueda, Yokohama; Shuichi Akita, Kamakura; Tetsuo Ohyama, Yokohama; Toshio Kase, Tokyo, all of Japan

[73] Assignee: Nippon Zeon Co., Ltd., Tokyo, Japan

[21] Appl. No.: 685,234

[22] Filed: Dec. 21, 1984

[30] Foreign Application Priority Data

Dec. 26, 1983 [JP] Japan ............................. 58-249100
Aug. 2, 1984 [JP] Japan ............................. 59-163404
Oct. 26, 1984 [JP] Japan ............................. 59-225494

[51] Int. Cl.$^4$ .......................... C08F 8/30; C08F 8/34
[52] U.S. Cl. .................................. 528/232; 525/241; 525/280; 525/296; 525/332.9; 525/333.2; 525/348; 525/352; 525/374; 525/375
[58] Field of Search .................. 525/280, 296, 332.9, 525/333.2, 232, 241

[56] References Cited

U.S. PATENT DOCUMENTS 3,590,008 6/1971 Hansley et al. ................. 525/296
4,282,132 8/1981 Benda et al. ..................... 525/280

Primary Examiner—Joseph L. Schofer
Assistant Examiner—Bernard Lipman
Attorney, Agent, or Firm—Sherman and Shalloway

[57] ABSTRACT

A process for modifying a polymer of a conjugated diene, which comprises reacting a polymer of a conjugated diene containing at least one metal selected from alkali metals and alkaline earth metals with a compound having a linkage of the following formula

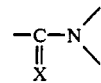

wherein X represents an oxygen or sulfur atom, in the molecule.

11 Claims, No Drawings

PROCESS FOR MODIFYING CONJUGATED DIENE POLYMERS

This invention relates to a process for modifying a polymer of a conjugated diene containing at least one metal selected from alkali metals and alkaline earth metals, a modified polymer obtained by the aforesaid process, and to a vulcanizable rubber composition containing the modified polymer.

In recent years, it has been strongly desired to reduce the rolling resistance of tires and provide excellent breaking characteristics on a wet road surface, namely excellent wet skid resistance. Generally, these properties of tires are considered in relation to the dynamic viscoelastic properties of tread rubber materials and are known to be contradictory to each other (see, for example, Transaction of I. R. I., Vol. 40, pages 239–256, 1964).

To reduce the rolling resistance of tires, tread rubber materials should have high rebound. When the running condition of an automobile is considered, the rebound should be evaluated at a temperature of 50° C. to about 70° C. On the other hand, for improvement of the breaking propery on a wet road surface which is important in regard to the safety of the automobile, the tires should have high wet skid resistance as measured by a British portable skid tester. The tread rubber material should permit a large loss of energy as frictional resistance which is generated when a tire is allowed to slide over a road surface while being subjected to braking.

To provide a compromise between these two properties, various methods of improving polymers have been proposed. For example, there have been proposed a method in which the vinyl content and the styrene content of a styrene-butadiene copolymer are adjusted to specific values (Japanese Laid-Open Patent Publication No. 62248/1979), a method in which the styrene chain distribution of the above copolymer is adjusted to a specific one (Japanese Laid-Open Patent Publication No. 143209/1981), and a method in which the vinyl linkage chain distribution of the above copolymer is adjusted to a specific one (Japanese Laid-Open Patent Publication No. 149413/1981). The improved effects obtained by these methods, however, are only slight, and a further great improvement is desired.

As a method of introducing reactive groups into molecular chains, U.S. Pat. No. 3,109,871 discloses a method which comprises reacting a polymer containing a terminal alkali metal with an N,N-disubstituted amino ketone thereby to introduce a hydroxyl group and a tertiary amino group into the chain end. The purpose of this patent is to produce a polymeric product, especially a liquid polymer, capable of being cured by a polyfunctional curing agent (such as a polyisocyanate) by utilizing the above reactive groups.

It is an object of this invention to provide a polymer of a conjugated diene having increased rebound without reducing its wet skid resistance, and a process for producing the aforesaid polymer.

The present inventors produced a high-molecular-weight polymer of a conjugated diene by using the method of the above-cited U.S. patent, vulcanized the polymer with a sulfur vulcanization system, and measured the properties of the vulcanizate. Surprisingly, the present inventors found that this vulcanizate had markedly improved rebound over vulcanizates of conventional polymers of conjugated dienes. On further investigations, the present inventors have discovered compounds which have equivalent effects to the compounds disclosed in the above U.S. patent.

According to this invention, a polymer of a conjugated diene achieving the above object is provided by a process which comprises reacting a conjugated diene polymer containing at least one metal selected from alkali metals and alkaline earth metals with a compound having a linkage of the following formula

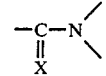

wherein X represents O or S, in the molecule.

Another object of this invention is to provide a vulcanizable rubber composition having improved rebound.

This object is achieved by a rubber composition comprising at least 10% by weight, based on the entire rubber component, of a polymer of a conjugated diene obtained by the aforesaid process, and a vulcanization system.

The process for modifying a polymer of a conjugated diene and the product of this process will first be described.

The conjugated diene polymer containing an alkali metal and/or an alkaline earth metal used in this invention includes, for example, a conjugated diene polymer having the alkali metal and/or the alkaline earth metal bonded to the terminal of the polymer which is obtained by polymerizing a diene monomer either alone or together with another monomer copolymerizable with the diene monomer in the presence of a catalyst based on the alkali metal and/or the alkaline earth metal, and a conjugated diene polymer which is obtained in accordance with any polymerization method (such as solution polymerization or emulsion polymerization) by adding the alkali metal and/or the alkaline earth metal to a diene polymer having a conjugated diene unit in the polymer chain by after-reaction.

Examples of the conjugated diene polymer rubber include homopolymers or copolymers of conjugated diene monomers having 4 to 12 carbon atoms such as 1,3-butadiene, isoprene, 1,3-pentadiene, 2,3-dimethyl-1,3-butadiene, 1,3-hexadiene and chloroprene; and copolymer rubbers of such conjugated diene monomers with copolymerizable comonomers, for example aromatic vinyl compounds such as styrene, alpha-methylstyrene, vinyltoluene, vinylnaphthalene, divinylbenzene, trivinylbenzene, divinylnaphthalene and vinylpyridine, and unsaturated nitriles such as acrylonitrile and (meth)acrylic esters. These examples are not limitative. Typical examples are polybutadiene rubber, polyisoprene rubber, butadiene-isoprene copolymer rubber and butadiene-styrene copolymer rubber.

The conjugated diene polymer having the alkali metal and/or the alkaline earth metal bonded to its end is a living polymer before stopping of the polymerization in which the alkali metal and/or the alkaline earth metal is bonded to at least one end of the polymer chain, and which is obtained by polymerizing the aforesaid diene monomer either alone or with another monomer in the presence of a catalyst based on the alkali metal and/or the alkaline earth metal. The alkali metal base catalyst, the alkaline earth metal base catalyst, the polymerization solvent, the randomizer, the agent for adjusting the microstructure of the conjugated diene unit, etc. which are normally used in solution polymerization may be used, and there is no particular restriction on the method of producing the above polymer.

The conjugated diene polymer rubber having the alkali metal and/or alkaline earth metal added thereto is produced by adding the alkali metal and/or the alkaline earth metal to a conjugated diene polymer obtained by polymerizing the aforesaid conjugated diene monomer either alone or with a monomer copolymerizable therewith by usual polymerization methods, for example solution polymerization using the alkali metal base catalyst, alkaline earth metal base catalyst, a Ziegler catalyst, etc., or emulsion polymerization using a redox-type catalyst, etc. (specific examples include polybutadiene rubber, polyisoprene rubber, butadiene-styrene copolymer rubber, butadiene-isoprene copolymer rubber, polypentadiene rubber, butadiene-piperylene copolymer rubber, and butadiene-propylene alternate copolymer rubber).

The addition of the alkali metal and/or the alkaline earth metal to the conjugated diene polymer can be carried out by usual methods. For example, the addition reaction is carried out by maintaining the conjugated diene polymer at a temperature of 30° to 100° C. for several tens of minutes to several tens of hours in a hydrocarbon solvent in the presence of an ordinary alkali metal base catalyst and/or alkaline earth metal base catalyst and a polar compound such as an ether, amine or phosphine compound. The amount of the alkaline metal base catalyst and/or the alkaline earth metal base catalyst used may be usually 0.1 to 10 millimoles per 100 g of the conjugated diene polymer. If it is less than 0.1 millimole, no increase in rebound can be obtained. If it exceeds 10 millimoles, side-reactions such as the crosslinking and cleaving of the polymer occur to cancel the increase in rebound.

The amount of the polar compound used is usually 0.1 to 10 moles, preferably 0.5 to 2 moles, per mole of the alkali metal base catalyst and/or the alkaline earth metal base catalyst.

Examples of the alkali metal base catalysts and the alkaline earth metal base catalysts used in the polymerization and addition reaction are shown below.

The alkali metal base catalyst is a lithium, sodium, potassium, rubidium, cesium, or a complex of such a metal with a hydrocarbon compound or a polar compound. Preferably, it is a lithium compound having 2 to 20 carbon atoms. Specific examples include ethyllithium, n-propyllithium, i-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, 1,4-dilithio-butene-2-sodium naphthalene, sodium biphenyl, potassium-tetrahydrofuran complex, potassium diethoxyethane complex and a sodium salt of alpha-methylstyrene tetramer.

The alkaline earth metal base catalyst may include, for example, the catalyst systems comprising as a main component a compound of barium, strontium, calcium, etc. which are disclosed, for example, in the specifications of Japanese Laid-Open Patent Publications Nos. 115590/1976, 9090/1977, 17591/1977, 30543/1977, 48910/1977, 98077/1977, 112916/1981 and 100146/1982, but is not limited to these.

The polymerization reaction and the addition reaction of adding the alkali metal and/or the alkaline earth metal are carried out in a solvent which does not break the alkali metal base catalyst and/or the alkaline earth metal catalyst, such as tetrahydrofuran, tetrahydropyran and dioxane. Suitable hydrocarbon solvents are selected from aliphatic hydrocarbons, aromatic hydrocarbons and alicyclic hydrocarbons. Preferred solvents are those containing 2 to 12 carbon atoms, such as propane, n-butane, i-butane, n-pentane, i-pentane, n-hexane, cyclohexane, propene, 1-butene, i-butene, trans-2-butene, cis-2-butene, 1-pentene, 2-pentene, 1-hexene, 2-hexene, benzene, toluene, xylene and ethylbenzene. These solvents may be used in combination.

The compound to be reacted with the conjugated diene polymer containing the alkali metal and/or the alkaline earth metal in the process of this invention may be any compound which has the

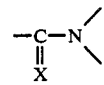

linkage (X is an oxygen or sulfur atom) and reacts with the aforesaid metal. Specific examples of such a compound include amides and imides such as formamide, N,N-dimethylformamide, N,N-diiethylformamide, acetamide, N,N-dimethylacetamide, N,N-diethylacetamide, aminoacetamide, N,N-dimethyl-N',N'-dimethylaminoacetamide, N',N'-dimethylaminoacetamide, N'-ethylaminoacetamide, N,N-dimethyl-N'-ethylaminoacetamide, N,N-dimethylaminoacetamide, N-phenyldiacetamide, acrylamide, N,N-dimethylacrylamide, N,N-dimethylmethacrylamide, propionamide, N,N-dimethylpropionamide, 4-pyridylamide, N,N-dimethyl-4-pyridylamide, benzamide, N-ethylbenzamide, N-phenylbenzamide, N,N-dimethylbenzamide, p-aminobenzamide, N',N'-(p-dimethylamino)benzamide, N',N'-(p-diethylamino)benzamide, N'-(p-methylamino)benzamide, N'-(p-ethylamino)benzamide, N,N-dimethyl-N'-(p-ethylamino)benzamide, N,N-dimethyl-N',N'(p-diethylamino)benzamide, N,N-dimethyl-p-aminobenzamide, N-methyldibenzamide, N-acetyl-N-2-naphthylbenzamide, succinamide, maleinamide, phthalamide, N,N,N',N'-tetramethylmaleinamide, N,N,N',N'-tetramethylphthalamide, succinimide, N-methylsuccinimide, maleimide, N-methylmaleimide, phthalimide, N-methylphthalimide, oxamide, N,N,N',N'-tetramethyloxamide, N,N-dimethyl-p-amino-benzalacetamide, nicotinamide, N,N-diethylnicotinamide, 1,2-cyclohexanedicarboxamide, N-methyl-1,2-cyclohexanedicarboximide, methyl carbamate, methyl N-methylcarbamate, ethyl N,N-diethylcarbamate, ethyl carbanilate and ethyl p-N,N-diethylaminocarbanilate; anilides such as formanilide, N-methylacetanilide, aminoacetanilide, benzanilide and p,p'-di(N,N-diethyl)aminobenzanilide; lactams such as epsilon-caprolactam, N-methyl-epsiloncaprolactam, N-acetylepsilon-caprolactam, 2-pyrrolidone, N-methyl-2-pyrrolidone, N-acetyl-2-pyrrolidone, 2-piperidone, N-methyl-2-piperidone, 2-quinolone, N-methyl-2-quinolone, 2-indolinone and N-methyl-2-indolinone; isocyanuric acids such as isocyanuric acid and N,N',N''-trimethylisocyanuric acid and sulfur-containing compounds corresponding to these. Compounds having an alkyl group bonded to nitrogen are especially preferred.

The amount of the above compound is usually 0.05 to 10 moles, preferably 0.2 to 2 moles, per mole of the alkali metal base catalyst or alkaline earth metal base catalyst used to produce the conjugated diene polymer containing the alkali metal and/or alkaline earth metal. In other words to improve the rebound of the conjugated diene polymer, the amount of the aforesaid metal bonded to the conjugated diene polymer is at least 0.1 mole, preferably at least 0.3 mole, more preferably at least 0.7 mole, per mole of the polymer. If the amount of the metal is more than 5 moles, the rubbery elasticity of the polymer is undesirably impaired. The amount of the aforesaid compound to be reacted with the above metal is equimolar to, or slightly in excess of, the bonded metal in the polymer.

The reaction of the metal bonded to the polymer with the aforesaid compound takes place rapidly, and the reaction temperature and time can be selected from broad ranges. Generally, temperatures from room temperature to 100° C. and periods of several seconds to several hours are used.

The reaction is carried out by contacting the conjugated diene polymer containing the aforesaid metal with the aforesaid compound. For example, a method which comprises preparing the diene polymer using the alkali metal base catalyst and adding a predetermined amount of the aforesaid compound to a solution of the polymer, and a method which comprises performing the addition-reaction of the alkali metal in a solution of the diene polymer and subsequently adding and reacting the aforesaid compound may be cited as preferred embodiments. But the invention is not limited to these methods.

After the reaction, the conjugated diene polymer is separated from the reaction solution by coagulating methods usually employed in the production of rubber by solution polymerization, for example by adding a coagulating agent such as alcohol, or steam coagulation. In this step, the aforesaid compound introduced into the polymer is hydrolyzed and introduced as an atomic grouping of the formula

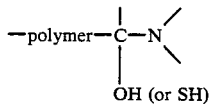

into the terminal of the molecular chain of the modified conjugated diene polymer or into its molecular chain.

When the reaction solution after the above reaction is further reacted with a divalent or higher acid and/or halogen compound, the above compound forms a salt or charge-transfer complex with the above atomic grouping, and the modified conjugated diene polymer has improved rebound and improved processability such as operability on rolls.

Preferred acids are inorganic and organic acids, and specifically include oxalic acid, malonic acid, succinic acid, maleic acid, phthalic acid, benzenedisulfonic acid, benzenedisulfinic acid and citric acid. Examples of useful halogen compounds include fluorine, chlorine, bromine, iodine, iodine monochloride, iodine trichloride, chlorine trifluoride, iodine bromide, iodine fluoride, iodine oxide, sulfur dichloride, thionyl chloride, tin tetrachloride, titanium tetrachloride, boron trichloride and carbon tetrachloride.

Preferably, the reaction of the acid and/or halogen compound with the atomic grouping

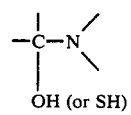

introduced into the molecular chain of the modified conjugated diene polymer is carried out immediately after the reaction of introducing the aforesaid atomic grouping. The solvent used in the reaction of introducing the atomic grouping is preferably inert to the acid and halogen compound. Such solvents include, for example, halogenated hydrocarbons such as carbon tetrachloride and chloroform and aprotic solvents such as dimethylformamide and dimethyl sulfoxide, in addition to the solvents exemplified hereinabove in describing the reaction of introducing the above atomic grouping. The rection temperature is usually −80° to 100° C. preferably 10° to 50° C. For rapid progress of the reaction, irradiation of light is preferred. The amount of the acid and/or halogen compound used is at least equimolar to the amount of the compound used in the reaction of introducing the atomic grouping. After the reaction, the modified conjugated diene polymer can be separated in the same way as described above.

The above compound may be introduced into the end of the molecular chain or other sites, preferably the former. The use of a polymer obtained by reacting a living diene polymer in which the end of the molecular chain is of a dienyl structure with the aforesaid compound leads to a further improvement in rebound.

The end of the molecular chain of the conjugated diene polymer may be converted to a dienyl metal by various methods, for example by adding a conjugated diene monomer to the polymer after the copolymerization (usually the monomer is added in an amount equivalent to the metal end of the polymer, preferably about 10 to 100 moles per mole of the metal end), or a method in which the copolymerization is carried out in a polymerization reactor equipped with a reflux condenser. The methods, however, are not particularly limited so long as they result in the conversion of the end of the polymer chain into a diene.

The conjugated diene polymer modified in accordance with the process of this invention is very useful as a rubbery material for low fuel cost tire treads since it has markedly improved rebound.

The modified conjugated diene polymer has a Mooney viscosity ($ML_{1+4, 100° C.}$) of usually 10 to 200, preferably 20 to 150. If it is less than 10, the polymer has inferior mechanical properties such as tensile strength. If it exceeds 200, it has poor miscibility with other rubbers and the processability of the mixture becomes difficult. This results in a reduction in the mechanical properties of a vulcanizate of the resulting rubber composition.

The vulcanizable rubber composition having improved rebound which is the second object of this invention comprises a conjugated diene polymer modified by the introduction of the compound having the

bond (wherein X is an oxygen or sulfur atom) in the molecule into the polymer chain, and a vulcanization system. The modified conjugated diene polymer should be contained in an amount of at least 10% by weight, preferably at least 20% by weight, more preferably at least 30% by weight, based on the entire rubber component of the composition. If its amount is less than 10% by weight, an improvement in rebound cannot be expected.

When the above modified conjugated diene polymer is used in combination with another rubber, a rubber which is suitable for the purpose of using the resulting rubber composition may be selected from emulsion-polymerized or solution-polymerized styrene-butadiene copolymer rubber, emulsion-polymerized or solution-polymerized polybutadiene rubber, solution-polymerized polyisoprene rubber, natural rubber, etc.

Examples of preferred rubber combinations for rubber compositions of this invention used in tire treads are shown below.

(1) Modified polybutadiene (1,2-linkage unit 10–90%)/styrene-butadiene copolymer rubber (combined styrene 5–50% by weight, the 1,2-linkage unit of the butadiene unit 10–80%) and/or polyisoprene rubber/high cis-1,4-polybutadiene rubber (10–80/20–90/0–30% by weight).

(2) Modified styrene-butadiene copolymer rubber (combined styrene 5–50% by weight, the 1,2-linkage unit of the butadiene unit 10–90%)/styrene-butadiene copolymer rubber (combined styrene 5–50% by weight, the 1,2-linkage unit of the butadiene unit 10–80%) and/or polyisoprene rubber/high cis-1,4-polybutadiene rubber (10–100/0–90/0–50% by weight).

The vulcanization system to be blended with the rubber component may be those which are usually employed in the rubber industry. Examples include sulfur, stearic acid, zinc oxide, various vulcanization accelerators (for example, guanidine compounds such as diphenylguanidine, thiazole compounds such as mercaptobenzothiazole, dibenzothiazyl disulfide, cyclohexylbenzothiazyl sulfenamide and N-oxydiethylene-2-benzothiazyl sulfenamide, and thiuram compounds such as tetramethylthiuram disulfide and tetramethylthiuram monosulfide), and organic peroxides.

There may be used other compounding agents such as reinforcing agents (e.g., carbon black of various grades such as HAF and ISAP, and silica), fillers (e.g., calcium carbonate and talc), process oils, processing aids, vulcanization retarders, antioxidants, etc. The types and amounts of these compounding agents are selected according to the purpose of using the final rubber composition, and are not particularly limited in this invention.

The rubber component used in this invention may be used wholly or partly as an oil-extended rubber.

The rubber composition of this invention can be produced by mixing the rubber component with various compounding agents by means of a mixer such as a roll and a Banbury mixer.

Since the rubber composition of this invention permits a compromise between rebound and wet skid resistance on a high level, it is particularly suitable as a rubber material for automobile tire treads. It can also be used in automobile tires, shoe soles, floor materials and rubber vibration insulators.

The following examples illustrate the present invention more specifically. It should be understood however, that the invention is not limited to these examples.

EXAMPLE 1

In each run, a 2-liter stainless steel polymerization reactor was charged with 150 g of 1,3-butadiene, 820 g of benzene, 0.5 millimole of diethylene glycol dimethyl ether (diglyme) and 1.0 millimole of n-butyllithium (as an n-hexane solution), and with stirring, the polymerization was carried out at 40° C. for 1 hour. After the reaction, each of the compounds indicated in Table 1 was added and reacted with stirring for 5 minutes. The contents of the polymerization reactor were poured into methanol containing 1.5% by weight of 2,6-di-t-butyl-p-cresol (BHT) to coagulate the resulting polymer.

The polymer was dried at 60° C. for 24 hours under reduced pressure, and its Mooney viscosity ($ML_{1+4, 100° C.}$) and 1,2-linkage unit content of the butadiene units (by infrared spectroscopy) were measured. The results are shown in Table 1.

TABLE 1

| Rubber No. | Additive Compound | Amount (millimoles) | Mooney viscosity | 1,2-Linkage unit (mole %) |
|---|---|---|---|---|
| 1 | N,N,N',N'—tetramethylurea | 1.0 | 60 | 68 |
| 2 | N,N,N',N'—tetramethylthiourea | 1.0 | 60 | 68 |
| 3 | N,N'—dimethylethyleneurea | 1.0 | 59 | 68 |
| 4 | N,N—dimethyl-N',N'—(p-dimethylamino)-benzamide | 1.0 | 60 | 69 |
| 5 | N—ethyl-N—methyl-8-quinolinecarboxamide | 1.0 | 60 | 68 |
| 6 | N,N'—dimethylnicotinamide | 1.0 | 59 | 68 |
| 7 | N—methyl-epsilon-caprolactam | 1.0 | 58 | 67 |
| 8 | N,N,N',N'—tetramethylphthalimide | 1.0 | 60 | 68 |
| 9 | N,N,N',N'—tetramethylaminoacetamide | 1.0 | 59 | 68 |
| 10 | N—methyl-2-indolinone | 1.0 | 58 | 69 |
| 11 | N—methyl-2-pyrrolidone | 1.0 | 60 | 68 |
| 12* | None | 0 | 60 | 68 |

*Comparison.

EXAMPLE 2

In each run, each of the rubbers indicated in Table 1 was kneaded with various compounding agents in accordance with the compounding recipe shown in Table 2 in a 250 ml. Brabender-type mixer to obtain a rubber composition. The rubber composition was press-cured at 160° C. for 15 to 25 minutes to prepare a test specimen.

The strength properties of the specimen were measured in accordance with JIS K-6301. The rebound of the specimen was measured at 53° C. by a Dunlap tripsometer. The wet skid resistance of the specimen was measured at 23° C. on a road surface set forth in ASTM E-303-74 by using a portable skid tester (made by Stanley Co., Britain). The results are summarized in Table 3.

TABLE 2

| | Parts by weight |
|---|---|
| Rubber component (see Table 1) | 100 |

TABLE 2-continued

| | Parts by weight |
|---|---|
| HAF carbon black | 50 |
| Aromatic process oil | 10 |
| ZnO No. 3 | 3 |
| Stearic acid | 2 |
| Sulfur | 1 |
| N—oxydiethylene-2-benzoathiazyl sulfenamide | 2 | that the amount of sulfur was changed to 1.8 parts by weight and 1.0 part by weight of N-cyclohexyl-2-benzothiazyl sulfenamide was used instead of 2 parts by weight of N-oxydiethylene-2-benzothiazyl sulfenamide) using each of the rubbers indicated in Table 4 and high cis-1,4-polybutadiene (Nipol BR 1220, a product of Nippon Zeon Co., Ltd.). The rubber composition was press-cured to prepare a specimen which was tested in the same way as in Example 1. The results are summarized in Table 5.

TABLE 5

| Type of rubber, and test item | Run No. | | | | | | | | | | |
|---|---|---|---|---|---|---|---|---|---|---|---|
| | Invention | | | | | Comparison | | Invention | | | |
| | 1 | 2 | 3 | 4 | 5 | 6 | 7 | 8 | 9 | 10 | 11 |
| Rubber No. 13 | 100 | | | | | | | | | | |
| Rubber No. 14 | | 100 | | | | | | 90 | 70 | 50 | |
| Rubber No. 15 | | | 100 | | | | | | | | |
| Rubber No. 16 | | | | 100 | | | | | | | |
| Rubber No. 17 | | | | | 100 | | | | | | 70 |
| Rubber No. 18 | | | | | | 100 | | | | | |
| High cis-1,4-polybutadiene | | | | | | | 100 | 10 | 30 | 50 | 30 |
| Rebound (%) | 65 | 65 | 65 | 65 | 65 | 59 | 61 | 64 | 64 | 63 | 64 |
| Wet skid resistance | 75 | 75 | 75 | 75 | 75 | 75 | 50 | 72 | 67 | 62 | 67 |
| Tensile strength (kg/cm$^2$) | 235 | 241 | 240 | 243 | 238 | 229 | 185 | 230 | 222 | 213 | 225 |
| Elongation (%) | 420 | 420 | 420 | 410 | 420 | 440 | 430 | 420 | 430 | 420 | 430 |
| 300% Tensile stress (kg/cm$^2$) | 137 | 135 | 138 | 140 | 136 | 130 | 113 | 137 | 130 | 129 | 138 |

TABLE 3

| Test item | Run No. | | | | | | | | | | | |
|---|---|---|---|---|---|---|---|---|---|---|---|---|
| | Invention | | | | | | | | | | | Comparison |
| | 1 | 2 | 3 | 4 | 5 | 6 | 7 | 8 | 9 | 10 | 11 | 12 |
| Rebound (%) | 66 | 65 | 66 | 67 | 65 | 67 | 67 | 65 | 66 | 66 | 66 | 57 |
| Wet skid resistance | 77 | 76 | 77 | 76 | 77 | 77 | 77 | 76 | 76 | 77 | 76 | 76 |
| Tensile strength (kg/cm$^2$) | 202 | 200 | 205 | 203 | 199 | 200 | 203 | 197 | 205 | 202 | 205 | 180 |
| Elongation (%) | 390 | 380 | 390 | 390 | 400 | 400 | 380 | 400 | 390 | 390 | 390 | 400 |
| 300% Tensile stress (kg/cm$^2$) | 129 | 131 | 132 | 130 | 130 | 129 | 131 | 129 | 130 | 130 | 132 | 126 |

EXAMPLE 3

In each run, a polymerization vessel was charged with 112.5 g of 1,3-butadiene, 37.5 g of styrene, 0.75 g of tetrahydrofuran and 0.75 millimole of n-butyllithium, and the polymerization was carried out at 45° C. for 2 hours in the same way as in Example 1. After the polymerization, each of the compounds indicated in Table 4 was added in an amount of 2.0 millimole and reacted. The properties of the resulting polymer are shown in Table 4.

TABLE 4

| Rubber No. | Compound | Mooney viscosity | 1,2-linkage (mole %) | Combined styrene (wt. %) |
|---|---|---|---|---|
| 13 | N,N—dimethylnicotinamide | 60 | 37 | 24.9 |
| 14 | N,N,N',N'—tetramethylurea | 60 | 37 | 25.0 |
| 15 | N,N,N',N'—tetramethylaminoacetamide | 59 | 37 | 24.8 |
| 16 | N—methyl-2-pyrrolidone | 60 | 37 | 25.0 |
| 17 | N—methyl-epsilon-caprolactam | 60 | 37 | 24.9 |
| 18* | None | 60 | 37 | 25.0 |

(*)Comparison

EXAMPLE 4

In each run, a rubber composition was prepared in accordance with the recipe shown in Table 2 (except

EXAMPLE 5

In each run, after the polymerization reaction in Example 3 was completed, 2 g of 1,3-butadiene was added and the polymerization was continued to form a polymer having a butadienyl structure at the end of the molecular chain. After completion of the polymerization, 2.0 millimoles of N-methyl-epsilon-caprolactam was added and reacted.

A vulcanizate was obtained in accordance with the same compounding recipe as in Example 4 using the resulting rubber (rubber No. 19), styrene-butadiene copolymer rubber produced by coupling with tin tetrachloride in a customary manner (rubber No. 20; combined styrene 25% by weight, the 1,2-linkage unit of the butadiene unit 38%, weight average molecular wight $3.9 \times 10^5$), high cis-1,4-polybutadiene and the rubber obtained in Example 4 (rubber No. 17) either alone or as a mixture in the proportions shown in Table 6.

The vulcanizate was tested, and the results are summarized in Table 6.

TABLE 6

| Type of rubber and test item | Run No. | | | | | | |
|---|---|---|---|---|---|---|---|
| | Invention | | Comparison | Invention | | | |
| | 1 | 2 | 3 | 4 | 5 | 6 | 7 |
| Rubber No. 17 | 100 | | | 50 | | | |
| Rubber No. 19 | | 100 | | | 70 | 50 | 50 |
| Rubber No. 20 | | | 100 | 50 | 30 | 50 | 30 |

TABLE 6-continued

| Type of rubber and test item | Run No. | | | | | | |
|---|---|---|---|---|---|---|---|
| | Invention | | Comparison | Invention | | | |
| | 1 | 2 | 3 | 4 | 5 | 6 | 7 |
| High cis-1,4-polybutadiene | | | | | | | 20 |
| Rebound (%) | 65 | 67 | 67 | 64 | 66 | 65 | 64 |
| Wet skid resistance | 75 | 75 | 75 | 75 | 75 | 75 | 70 |
| Tensile strength (kg/cm$^2$) | 238 | 250 | 240 | 243 | 258 | 235 | 220 |
| Elongation (%) | 420 | 420 | 430 | 420 | 430 | 410 | 420 |
| 300% Tensile stress (kg/cm$^2$) | 136 | 135 | 130 | 135 | 134 | 139 | 128 |

EXAMPLE 6

A 2-liter stainless steel polymerization reactor was washed, dried and purged with dry nitrogen. Then, 200 g of 1,3-butadiene and 800 g of n-hexane were added and uniformly mixed. Then, n-butyllithium, dibutylmagnesium, triethylaluminum and barium dinonyl phenoxide were added in this sequence so that the mole ratio of the catalyst, Ba/Mg/Li/Al, became 1/1.5/1.5/2, and the ratio of 1,3-butadiene/n-butyllithium became 300 (grams/millimole). The polymerization was subsequently performed at 50° C. for 15 hours. After the polymerization, 30 millimoles of N-methyl-2-pyrrolidone was added, and the mixture was stirred for 5 minutes. Methanol (10 ml) was added, and the mixture was further stirred for 5 minutes. The reaction mixture was then taken out into a 1.5% by weight methanol solution of BHT to coagulate the resulting polymer. The polymer was then dried at 60° C. under reduced pressure for 24 hours.

The Mooney viscosity of the resulting polymer was 50.0. The microstructure contents of the polymer determined by the Morero method using an infrared spectrometer were as follows:

| cis-1,4 | 17.1% |
|---|---|
| trans-1,4 | 76.9% |
| Vinyl | 6.0% |

A polymer was prepared as above except that N-methyl-2-pyrrolidone was not added. The resulting polymer had a Mooney viscosity of 40.0, and the same microstructure contents as above.

Each of the two polymer rubbers was kneaded with the various compounding agents in accordance with the compounding recipe of Example 2 on a roll, and the resulting rubber compound was press-cured at 160° C. for 25 minutes.

The rebound (measuring temperature 49° C.) and wet skid resistance of the vulcanized rubber were measured by the same methods as in Example 2. The results are shown in Table 7.

TABLE 7

| Run No.* | Rebound (%) | Wet skid resistance |
|---|---|---|
| 1 | 63.0 | 54.0 |
| 2 | 57.9 | 53.8 |

*Run No. 1 is in accordance with this invention using the modified polymer, while Run No. 2 is a comparison using the polymer before modification.

EXAMPLE 7

A 2-liter stainless steel polymerization reactor was charged with 65 g of polybutadiene (rubber No. 21, Mooney viscosity 40, 1,2-linkage unit 68%) and 650 g of dehydrated n-heptane to dissolve polybutadiene. To the solution were added 2.3 millimoles of n-butyllithiium and 2.3 millimoles of tetramethylethylenediamine, and the reaction was carried out at 70° C. for 1 hour. Furthermore, 2.0 millimoles of N,N-dimethylnicotinamide was added and reacted. The resulting polymer was recovered as in Example 1 (rubber No. 22).

The above reaction was repeated except that styrene-butadiene copolymer rubber (rubber No. 23, Mooney viscosity 60, combined styrene 25% by weight, the 1,2-linkage unit of the butadiene unit 37%) was used instead of polybutadiene (the resulting polymer was designated as rubber No. 24).

EXAMPLE 8

Test specimens were prepared by using the rubbers obtained in Example 7 in accordance with the compounding recipe shown in Example 4 (for polybutadiene) or the compounding recipe shown in Example 2 (for the styrenebutadiene copolymer rubber). The specimens were tested in the same way as in the foregoing examples, and the results are shown in Table 8.

TABLE 8

| Type of rubber and test item | Run No. | | | |
|---|---|---|---|---|
| | Comparison 1 | Invention 2 | Comparison 3 | Invention 4 |
| Rubber No. 21 | 100 | | | |
| Rubber No. 22 | | 100 | | |
| Rubber No. 23 | | | 100 | |
| Rubber No. 24 | | | | 100 |
| Rebound (%) | 56 | 60 | 59 | 64 |
| Wet skid resistance | 76 | 76 | 75 | 75 |
| Tensile strength (kg/cm$^2$) | 183 | 198 | 229 | 242 |
| Elongation (%) | 400 | 390 | 440 | 420 |
| 300% Tensile stress (kg/cm$^2$) | 128 | 134 | 130 | 140 |

EXAMPLE 9

Under the same conditions as in Example 1, butadiene rubber was reacted with 1.0 millimole of N-methylepsilon-caprolactam. After the reaction, 30 millimoles of oxalic acid was added to the reaction solution, and the mixture was stirred for 5 minutes. The reaction solution was taken into a 1.5% by weight methanol solution of BHT to coagulate the resulting polymer. The polymer was dried at 60° C. under reduced pressure for 24 hours to give polybutadiene rubber having a Mooney viscosity of 59. A vulcanizate was prepared by using the resulting polybutadiene rubber in accordance with the same compounding recipe and vulcanization conditions as in Example 2, and its rebound was measured. It was the same as the rebound of the polybutadiene rubber (rubber No. 7) of Example 2. When mixed with compounding agents on a roll, the polybutadiene rubber obtained in this Example did not undergo bagging, but rubber No. 7 underwent bagging.

What is claimed is:

1. A vulcanizable rubber composition comprising 10 to 100% by weight of a conjugated diene polymer consisting essentially of from 50-100% by weight of at least one conjugated diene monomer having 4 to 12 carbon atoms and from 0 to 50% by weight of aromatic vinyl compound, wherein at least 0.1 mole, per mole of polymer, of a group represented by formula

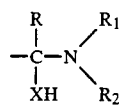

wherein X represents O or S, $R_1$ and $R_2$ are the same or different, and represent H or a substituent, and R represents an organic residue having no ethylenic double bond, or R and $R_1$ may optionally form a ring, is bonded to a carbon atom in said polymer chain, and 90 to 0% by weight of at least one rubber selected from the group consisting of styrene-butadiene copolymer rubber, polybutadiene rubber, polyisoprene rubber and natural rubber.

2. The rubber composition of claim 1 wherein the conjugated diene polymer is a polymer wherein said group is bonded to the ends of the polymer chain.

3. The rubber composition of claim 1 wherein the conjugated diene polymer is a polymer wherein said group is bonded to sites other than the end of the polymer chain.

4. The rubber composition of claim 1 wherein the conjugated diene polymer is at least one rubber selected from the group consisting of polybutadiene rubber, polyisoprene rubber, butadiene-isoprene copolymer rubber, polypentadiene rubber, butadiene-piperylene copolymer rubber, butadiene-styrene copolymer rubber and butadiene-propylene alternate copolymer rubber.

5. The rubber composition of claim 1 wherein the amount of the group bonded to the conjugated diene polymer is from 0.3 mol to 5 mols, per mol of the polymer.

6. A vulcanizable rubber composition which, when vulcanized, provides a rubber material having high wet skid resistance and high rebound and which is suitable for the rubber tread of automobile tires, said composition comprising, as the rubber component from 10 to 100% by weight of a rubber composition of the formula

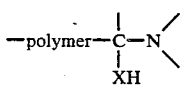

wherein -polymer- represents a rubbery homopolymer of a conjugated diene having from 4 to 12 carbon atoms, a copolymer of conjugated dienes each having from 4 to 12 carbon atoms or a copolymer of a conjugated diene having from 4 to 12 carbon atoms with a copolymerizable aromatic vinyl compound, and the group

is bonded to a carbon atom in the chain of said polymer in an amount of at least 0.1 mol per mole of said polymer and is the product of hydrolysis of a group of the formula

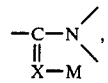

and M is alkali metal or earth metal, bonded to a carbon atom in the chain of said polymer, wherein said group of the formula

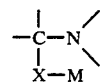

is derived from a compound containing a

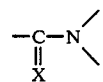

group, said compound being an organic compound selected from the group consisting of aliphatic compounds, aromatic compounds and heterocyclic compounds, and from 90 to 0% by weight of at least one rubber selected from the group consisting of styrene-butadiene copolymer rubber, polybutadiene rubber, polyisoprene rubber and natural rubber, and a vulcanization system.

7. The rubber composition of claim 6 wherein the group

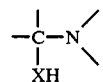

is bonded to the ends of the polymer chain.

8. The rubber composition of claim 6 wherein the group of the formula

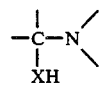

is bonded to a non-terminal carbon atom in the polymer chain.

9. The rubber composition of claim 6 wherein the polymer is selected from the group consisting of polybutadiene rubber, polyisoprene rubber, butadiene-isoprene copolymer rubber, polypentadiene rubber, butadiene-piperylene copolymer rubber, butadiene-styrene copolymer rubber, butadiene-propylene alternate copolymer rubber, and mixtures thereof.

10. The rubber composition of claim 6 wherein the group

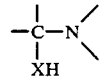

is bonded to said polymer in an amount of from about 0.3 to 5 mols, per mole of said polymer.

11. A vulcanizable rubber composition which, when vulcanized, provides a rubber material having high wet skid resistance and high rebound and which is suitable for the rubber tread of automobile tires, said composition comprising, as the rubber component from 10 to 100% by weight of a rubber composition of the formula

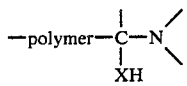

wherein -polymer- represents a rubbery homopolymer of a conjugated diene having from 4 to 12 carbon atoms, a copolymer of conjugated dienes each having from 4 to 12 carbon atoms or a copolymer of a conjugated diene having from 4 to 12 carbon atoms with a copolymerizable aromatic vinyl compound, and the group

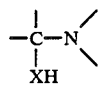

is bonded to a carbon atom in the chain of said polymer in an amount of at least 0.1 mol per mole of said polymer and is the product of hydrolysis of a group of the formula

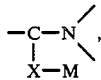

and M is an alkali metal or alkaline earth metal, bonded to a carbon atom in the chain of said polymer, wherein said group of the formula

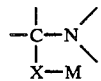

is derived from a compound containing the group,

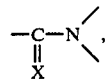

said compound being selected from the group consisting of formamide, N,N-dimethylformamide, N,N-diethylformamide, acetamide, N,N-dimethylacetamide, N,N-diethylacetamide, aminoacetamide, N,N-dimethyl-N',N'-dimethylaminoacetamide, N',N'-dimethylaminoacetamide, N'-ethylaminoacetamide, N,N'dimethyl-N'-ethylaminoacetamide, N,N'-dimethylaminoacetamide, N-phenyldiacetamide, propionamide, N,N-dimethylpropionamide, 4-pyridylamide, N,N-dimethyl-4-pyridylamide, benzamide, N-ethylbenzamide, N-phenylbenzamide, N,N-dimethylbenzamide, p-aminobenzamide, N'N'-(p-dimethylamino(benzamide, N'N'-(p-diethylamino)benzamide, N'-(p-methylamino)benzamide, N'-(p-ethylamino)benzamide, N,N-dimethyl-N'-(p-ethylamino)benzamide, N,N-dimethyl-N',N'(p-diethylamino)benzamide, N,N-dimethyl-p-aminobenzamide, N-methyldibenzamide, N-acetyl-N-2-naphthylbenzamide, succinamide, phthalamide, N,N,N',N'-tetramethylphthalamide, succinimide, N-methylsuccinimide, phthalimide, N-methylphthalimide, oxamide, N,N,N',N'-tetramethyloxamide, N,N-dimethyl-p-amino-benzalacetamide, nicotinamide, N,N-diethylnicotinamide, 1,2-cyclohexanedicarboxamide, N-methyl-1,2-cyclohexanedicarboximide, methyl carbamate, methyl N-methylcarbamate, ethyl N,N-diethylcarbamate, ethyl carbanilate, ethyl p-N,N-diethylamino-carbanilate, formanilide, N-methylacetanilide, aminoacetanilide, benzanilide, p,p'-di(N,N-diethyl)aminobenzanilide, epsilon-caprolactam, N-methyl-epsilon-caprolactam, N-acetylepsilon-caprolactam, 2-pyrrolidone, N-methyl-2-pyrrolidone, N-acetyl-2-pyrrolidone, 2-piperidone, N-methyl-2-piperdone, 2-quinolone, N-methyl-2-quinolone, 2-indolinone, N-methyl-2-indolinone, isocyanuric acid, N,N'N"-trimethylisocyanuric acid, and the corresponding sulfur-containing compounds, and from 90 to 0% by weight of at least one rubber selected from the group consisting of styrene-butadiene copolymer rubber, polybutadiene rubber, polyisoprene rubber and natural rubber, and a vulcanization system.

* * * * *